United States Patent [19]

Holtkamp et al.

[11] 3,841,423
[45] Oct. 15, 1974

[54] HYDROSTATIC PROPULSION SYSTEM
[75] Inventors: Donald A. Holtkamp; Willard L. Chichester, both of Battle Creek, Mich.
[73] Assignee: Clark Equipment Company, Buchanan, Mich.
[22] Filed: Oct. 15, 1973
[21] Appl. No.: 406,768

Related U.S. Application Data
[63] Continuation of Ser. No. 220,281, Jan. 24, 1972, abandoned.

[52] U.S. Cl. .................. 180/6.3, 60/484, 180/44 F, 180/66 R
[51] Int. Cl. .......................................... B60k 17/30
[58] Field of Search ................ 180/66 R, 44 F, 6.3; 60/484

[56] References Cited
UNITED STATES PATENTS

| | | | |
|---|---|---|---|
| 3,091,930 | 6/1963 | Thoma et al. | 180/66 R |
| 3,292,723 | 12/1966 | Pinkerton et al. | 180/66 R |
| 3,357,513 | 12/1967 | Sundberg | 180/66 R |
| 3,422,917 | 1/1969 | Guinot | 180/44 F |
| 3,656,570 | 4/1972 | Gortner | 180/66 R |

*Primary Examiner*—David Schonberg
*Assistant Examiner*—John A. Pekar
*Attorney, Agent, or Firm*—John C. Wiessler

[57] ABSTRACT

A closed recirculating hydrostatic transmission system suitable for driving a traction vehicle. The system includes an operator engine control, and an operator controlled reversible variable displacement pump which delivers pressure fluid to drive motors at two or four operator selectable vehicle traction wheels. Flow divider-combiner means proportions the total pump flow in forward and reverse drive both between front and rear pairs of wheels and between the non-dirigible wheels of one of said pairs of wheels for differentiating wheel speeds during vehicle turning. Valve means enables smooth transition and shifting between two and four-wheel traction drive at the operator's selection at any time whether the vehicle is at rest or in motion in traction drive. Braking the vehicle is effected by reversing the pump flow at selected conditions of either decreasing, constant or increasing engine speed.

31 Claims, 6 Drawing Figures

HYDROSTATIC PROPULSION SYSTEM

CROSS REFERENCE TO RELATED APPLICATION

This is a continuation application of application Ser. No. 220,281, filed Jan. 24, 1972, now abandoned.

BACKGROUND OF THE INVENTION

Hydrostatic transmission systems in vehicle applications affording two and four-wheel drive at the operator's selection have heretofore generally been of the open loop type wherein the fluid flow system originates and terminates at the reservoir or in which a pair of independent variable displacement pumps apply pressure fluid to opposite pairs of tandem wheel motors on opposite sides of the vehicle, or a single non-reversible variable displacement pump supplies pressure fluid to all wheel motors through reversing valves. In some instances a pair of pumps is non-reversible and supplies fluid to the motors through reversing valves. Among other problems and deficiences such as relative high cost and complexity, prior systems have not provided for a smooth transition from two to four-wheel drive and vice versa while the vehicle is in motion in traction drive.

In addition, although differential wheel speed of the non-dirigible wheels during vehicle steering operations has been provided heretofore by fluid divider-combiner means in hydrostatic drive systems, there has been no provision for positive four-wheel drive by additional primary fluid valving and divider-combiner means which, in non-steering operations, divides the total flow in proportion to the diameter of the wheels, such as when said pairs of wheels are of equal diameter, by halves to the front and rear pairs of drive wheels irrespective of any other operational factor, and which further provides for vehicle speed control.

SUMMARY OF THE INVENTION

The present invention concerns a traction drive hydrostatic transmission system of the closed loop type in which the operator is able to shift smoothly during driving of the vehicle at any vehicle speed from two to four-wheel drive or vice versa.

The invention provides also means for maintaining traction by primary flow divider-combiner means controllable to selectively combine or divide the total circuit flow for two or four-wheel drive in both forward and reverse. A second flow divider-combiner means receives fluid flow from a port of the primary flow divider-combiner and is responsive to steering angle for proportioning as a function thereof the latter fluid flow to the non-dirigible pair of wheels in order to properly differentiate the wheel speeds thereof during turning of the vehicle.

It is a primary object of our invention to provide a hydrostatic transmission system capable of providing any one or combination of the above functions in a system of relative simplicity and low cost.

Other more particular objects and features of the invention will become apparent to those skilled in the art from the following description and drawing forming a part hereof.

DESCRIPTION OF THE PREFERRED EMBODIMENTS

Figure 1:
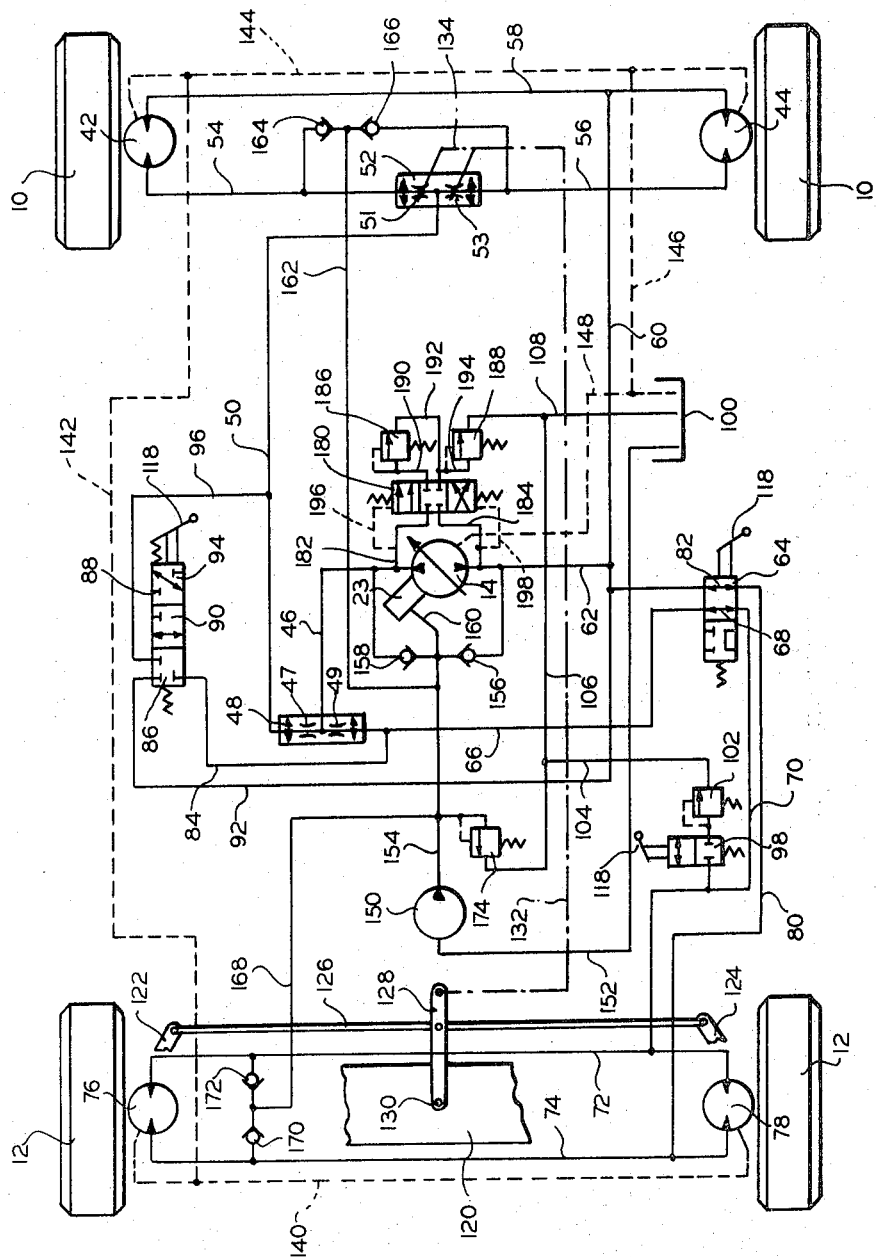
FIG. 1 is a schematic view of our hydrostatic transmission system in a vehicle.
Figure 2:
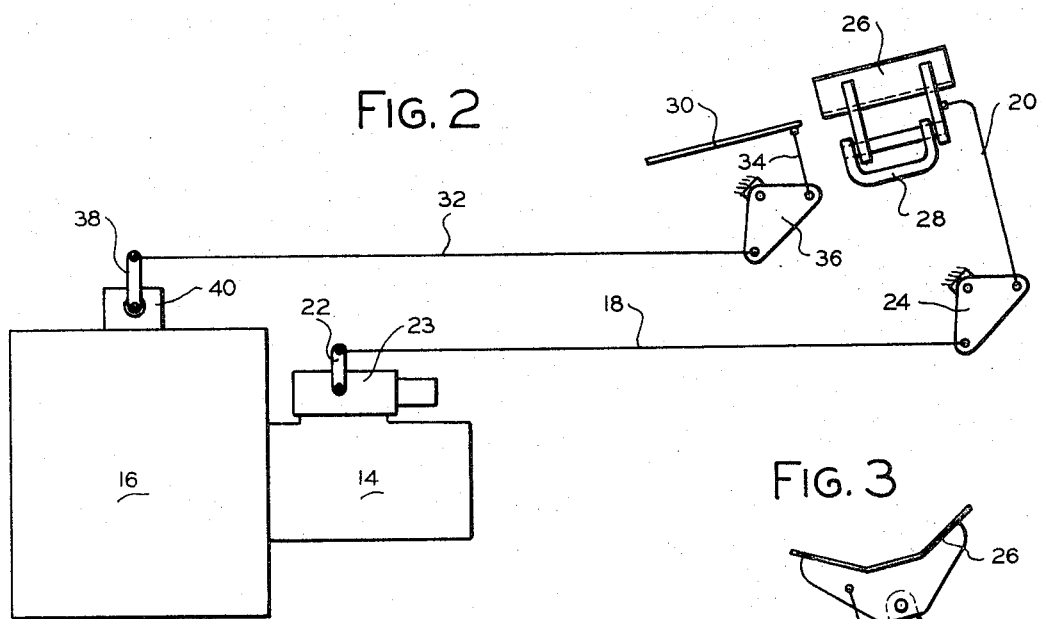
FIG. 2 is a schematic view of the vehicle engine, main pump, and the operator controls therefor.
Figure 3:
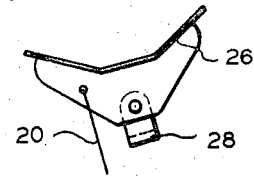
FIG. 3 is a front view of one of the operator's pump controls as shown in FIG. 2.

Referring now in detail to FIGS. 1–5, a vehicle is represented by front and rear pairs of drive wheels 10 and 12 in which is housed our hydrostatic transmission system which includes an operator controlled reversible variable displacement pump 14 driven by an engine 16 coupled thereto (FIG. 2), the camming or swash plate of the pump being directly controllable by push-pull cables and levers 18, 20, 22 and 24 actuatable by a reversible operator's pedal control 26 pivotally mounted from a bracket 28 and having a configuration such as shown for pulling cables 18 and 20 to adjust pump 14 for forward vehicle drive, and pushing said cables to adjust the pump for reverse drive. FIG. 2 represents the control conditioned in the neutral or zero stroke position of the pump. An accelerator pedal 30 may be similarly connected by push-pull cables and levers 32, 34, 36 and 38 to control the engine via a carburetor 40.

Pump 14 is connected hydraulically in forward drive to a pair of fixed displacement front wheel motors 42 and 44 by a main pump discharge conduit 46, the one side 47 of a main flow divider-combiner unit 48, a conduit 50, and a second adjustable flow divider-combiner 52 having divider units 51 and 53 therein in communication with branch conduits 54 and 56, respectively, which form with divider-combiner 52 a parallel loop circuit through the motors. Discharge fluid from the motors combines in conduit 58 and returns to the inlet side of the closed loop hydraulic circuit by way of conduits 60 and 62. When it is desired to operate motors 42 and 44 in reverse drive, the opposite direction of fluid flow occurs in the closed loop with conduit 62 receiving the pressure discharge flow of pump 14 and conduit 46 returning inlet flow to the pump, flow divider-combiner unit 52 functioning to combine the branch flows entering the unit from conduits 54 and 56 in a predetermined manner as will be described.

Rear wheels 12 are adapted to be driven at the option of the operator in a forward direction by pump 14 and an open control valve 64 by way of pressure discharge flow through conduit 46, a second flow divider portion 49 of unit 48, a conduit 66, a port 68 in valve 64, a conduit 70 which discharges into a parallel loop 72, 74 to rear wheel drive motors 76 and 78, the discharge flowing back to inlet conduit 62 of the pump via a conduit 80 and port 82 of valve 64.

It will be noted that a conduit 84 connects conduit 66 to a closed port 86 of a three-way valve 88, said valve being actuatable to communicate conduit 84 through a center port section 90 with conduit 60 by way of a conduit 92, and being further actuatable to interrupt the said connection and communicate conduit 84 with conduit 50 by way of an end port section 94 and a conduit 96. It will be further noted that with valve 88 in position as illustrated, a two-position valve 98 is also closed. Valve 98 is in a hydraulic fluid cooling circuit which is operative under certain conditions to return a limited amount of fluid circulating through motors 76 and 78 when wheels 12 are not in traction drive to a reservoir 100 by way of a minimum circuit pressure valve 102 which opens at, for example, 200 psi, and conduits 104, 106 and 108. When it is desired to operate the vehicle in reverse the pump discharge flows in reverse through the above circuit discharging through conduit 62 and receiving return fluid through conduit 46, in which mode of operation the sections 47 and 49 of flow unit 48 function to recombine the flows from the respective portions of total pump flow returning from the front and rear motor circuits.

Figure 4:
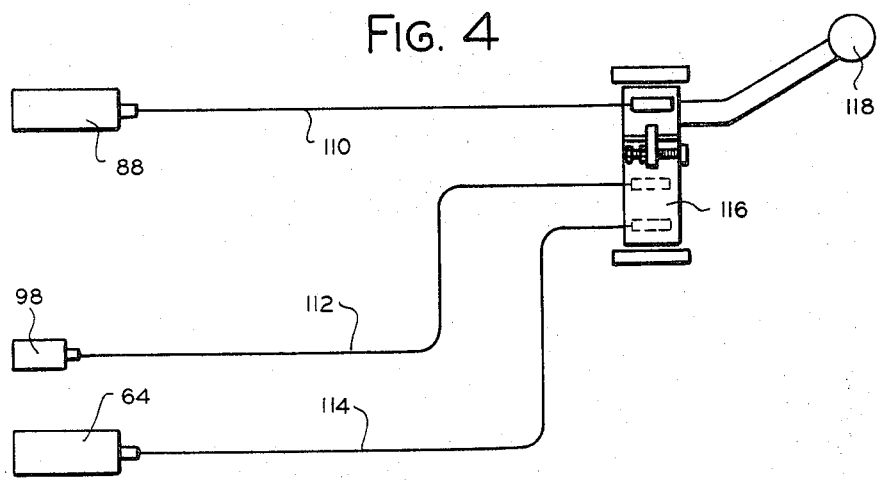
FIG. 4 is a schematic view of the operator's control for certain component valves shown in FIG. 1.
Figure 5:
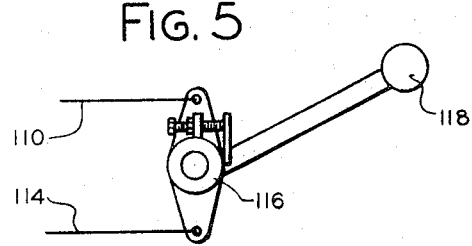
FIG. 5 is a plan view of the operator control portion of FIG. 4.

Valves 64, 88 and 98 are adapted to be operator controlled as by solenoid actuators or mechanical linkage. As shown in FIGS. 4 and 5, push-pull cables 110, 112 and 114 are connected to valves 88, 98 and 64, respectively, through a multiple cable actuator 116 to a control lever 118 which is rotated counterclockwise from a centered position as shown in FIG. 5 to effect two-wheel drive and clockwise from said position to effect four-wheel drive. In the two-wheel drive position cable 110 actuates valve 88 to connect conduits 84 and 96 through port section 94, and in four-wheel drive it positions valve 88 as illustrated in FIG. 1. When valve 88 is positioned for two-wheel drive, cables 112 and 114 have been actuated by lever means 116 and 118 to close valve 64 and open valve 98. In that condition of the three valves noted, fluid flow from conduit 66 through valve 64 is blocked and the portion of pressure fluid flowing through divider section 49 is recombined with the remaining portion flowing through divider section 47 by way of conduits 84 and 96, so that the total pump output is directed to divide equally at divider sections 51 and 53 when wheels 10 are at zero steering angle and in forward drive, and the vehicle is driven at full speed or, in effect, in "high" gear. It will be appreciated that when the system is adjusted to a four-wheel drive condition, all other conditions of operation being the same, that vehicle speed is equal to one-half the speed in two-wheel drive, and this condition may be referred to as "low" gear.

A steer axle is partially represented at numeral 120 on which dirigible wheels 12 are adapted to be mounted. Steering arms 122 and 124 of wheels 12 are pivotally connected to a tie-rod 126 which is pivotally connected at its center to a lever arm 128 pivotally connected in turn from the steer axle at 130 and to a push-pull cable represented by the broken line 132 which is connected to the flow divider-combiner unit 52, as shown schematically at numeral 134, for proportionalizing the fluid flowing to or from drive motors 42 and 44 as a function of the steer angle of wheels 12 as described further below.

Make-up fluid in the system is provided by a charging pump 150 connected to the reservoir by a conduit 152 and to the inlet of pump 14 by a conduit 154 and by one of the one-way check valves 156 or 158 communicating with conduits 62 and 46, respectively, depending upon forward or reverse operation of the pump. The fluid make-up circuit also communicates with the pump housing portion 23 by way of line 160 to supply pressure fluid to a servo valve and power boost piston housed therein which actuates the pump swash plate as controlled by operator's control lever 22 (FIG. 2). Charge pump 150 is also adapted to provide make-up fluid to the opposite ends of the transmission circuit at the circuit loop of motors 42 and 44 through conduit 162, low pressure one-way check valves 164 and 166 and their connections to conduits 54 and 56, and to the circuit loop of motors 76 and 78 by way of a conduit 168 low pressure one-way check valves 170 and 172 and their connections to conduits 72 and 74. A relief valve 174 responds to a predetermined limit pressure in conduit 154 to return fluid to the reservoir by way of conduits 106 and 108. A fluid leakage circuit is provided, as represented by the dotted lines 140, 142, 144, 146 and 148, which connects the four wheel motors and the pump to reservoir 100.

Main pump 14 includes a three-position reversing shuttle valve control 180 which is connected to pump conduits 46 and 62 by lines 182 and 184 and to the reservoir by maximum and minimum pump pressure control valves 186 and 188, respectively, and the lines 190, 192 and 194 which are adapted to connect the latter valves to the reservoir through conduit 108 at any time pump discharge pressure exceeds the preset maximum as controlled by valve 186. Control pressure lines 196 and 198 connect lines 182 and 184 to valve 180 to maintain the correct position thereof during operation. That is, if the pump is discharging to conduit 46 to propel the vehicle forwardly discharge pressure fluid activates valve 180 downwardly, as shown, via line 196 which establishes communication between the pump discharge and line 190 and between the pump inlet and line 192. High pressure valve 186 may be set to open at, say, 5,000 psi, and low pressure valve 188 at 200 psi. These valves maintain the maximum system pressures at pump inlet and discharge which, if exceeded, opens both valves 186 and 188 to return excess pressure fluid to the reservoir via lines 192, 194 and 108. If the inlet pressure alone should exceed the setting of valve 188 that valve will open to vent excess pressure oil to the reservoir via lines 184, 194 and 108.

When pump 14 operates in reverse the same operation occurs as is explained above except that the discharge and inlet pressure conduits of the pump are reversed and communicate through the lower valve section of shuttle valve 180 when it is actuated upwardly to connect then discharge conduit 62 to valve 186 and inlet conduit 46 to valve 188, in which condition the pump pressure control operates as above-described for forward vehicle operation. A suitable type swash plate pump and controls of the character above-described for use in such a hydrostatic transmission system is Model 60 as manufactured by the Hydreco Division of General Signal Corporation, Kalamazoo, Michigan.

In operation, the system as shown in FIG. 1 is in four-wheel drive wherein with pedal control 26 in forward drive and pedal 30 controlling a selected engine speed under existing load conditions, the total discharge of pump 14 enters unit 48 which functions as a flow divider to direct one-half of the total flow through each of sections 47 and 49. That portion directed through section 47 flows through conduit 50 for division at unit 52 which, with drive wheels 10 in straight ahead position as shown, directs one-half of the total flow thereto through each of sections 51 and 53 to traction drive motors 42 and 44, the motors discharging back to the pump inlet through conduits 58, 60 and 62. The other portion of the total flow which is directed through section 49 of the primary flow divider drives motors 76 and 78 through open valve 64 and into the motor loop 72, 74 which discharges back to the inlet of pump 14 by way of conduits 80 and 62, and valve 64.

During vehicle turning maneuvers the parallel fluid loop connecting motors 76 and 78 inherently provides, as is well-known, correct differentiation of the rpm of wheels 12 as a function of steer angle effected through the steering linkage, the differential speed increasing as the steer angle increases. In addition, movement of tie rod 126 to steer wheels 12 effects a corresponding movement of lever 128 about its pivot 130 on the steer axle which causes through push-pull cable 132 an adjustment of sections 51 and 53 in flow divider-combiner 52 in both direction and amount which is directly proportional to the steer angle, and which causes a division of the fluid flowing into the non-dirigible front wheel motor circuit as required to correctly differentiate the rotational speeds of wheels 10. That is, the outside wheel in any given vehicular turn is driven in traction to rotate at a speed greater than the driven inside wheel in an amount proportional to the steering angle. Further, the flow divider-combiner is so designed as to maintain at either section 51 or 53 thereof the same differential pressure causing flow through that section regardless of possible variations in pressure downstream in line 54 or 56 at any given setting of adjustment 134, thus eliminating the possibility of loss of traction at either wheel for any reason. A divider-combiner unit which performs as above-indicated is Model 2VXP1420 Series, manufactured by Fluid Controls, Inc., Mentor, Ohio.

During a shift of valve 88 from four-wheel to two-wheel drive it has been found advantageous to provide a transient condition of operation in which two-wheel drive is effected temporarily through valve section 90. When valve lever 118 shifts valve 88 to said transient condition it also opens valve 98 and closes valve 64, thus closing the circuit of drive motor loop 72, 74 to pump discharge and opening it to the fluid cooling circuit through valve 98 and pressure control valve 102. It will be understood that with motors 76 and 78 freewheeling in a closed circuit the circuit fluid will tend to rise in termperature and that cooling of the fluid may be effected through the secondary circuit which includes valves 98, 102 and reservoir 100, make-up oil flowing into said circuit loop by way of charging pump 150, conduit 168, and check valves 170 and 172, as previously described.

With control valve 88 so positioned, one-half of the system fluid flows through divider section 47 and further divides at divider-combiner 52 to drive traction wheels 10 as above-described, while the remaining system fluid flows back to pump inlet by way of conduits 84, 92, 60 and 62. The use of this operational transition in shifting from four to two-wheel drive while the vehicle is being driven at any selected speed has been found to be essential in order to control and minimize shock pressure loading in the system and jerky operation of the vehicle. Operation of the vehicle during such shifting of the drive effects a maintenance of vehicle speed substantially the same as in four-wheel drive, but with one-half of the system fluid not being utilized. Thus, the system is conditioned for subsequent two-wheel drive at full speed by the transient condition of two-wheel drive at one-half speed.

Further manipulation of control lever 118 to shift valve 88 in order to make operative valve section 94 has no effect on other system components such as drive motors 76 and 78 or valves 64 and 98. Shifting to valve secion 94 is preferably done in a controlled manner over a period of time of, say, from one to five seconds, depending upon other vehicle operating conditions such as load, terrain, and engine speed. Since the shift may, at the driver's option, occur at any engine speed, let it be assumed that it is made at full engine speed. Under this condition it will be apparent that it is desirable to shift valve 88 more slowly than at lower engine speeds, and during the shifting movement the system fluid flow being conducted through valve section 90 to pump inlet is gradually reduced and is redirected to traction motors 42 and 44 through valve section 94. As pointed out previously, if the engine speed is held constant the vehicle speed is doubled when valve 88 is fully shifted, said vehicle speed gradually increasing as a function of the duration of shifting valve 88. Operation of the system is similar when shifting from two-wheel to four-wheel drive in that valve 88 should be shifted in about the same time interval from valve section 94 to section 90 to reduce vehicle speed, after which a relatively rapid valve movement to operate valve section 86 is feasible in shifting from the two-wheel drive mode at one-half speed to four-wheel drive, the other system components operating, of course, in a reverse mode to that previously described.

As illustrated, control lever 118 is adapted to actuate the push-pull cables to the various valves as shown in FIGS. 4 and 5 through a simple lever arrangement, and so depends to some extent upon operator skill to properly shift valve 88 as above-described to achieve optimum smoothness of operation. It will be appreciated, of course, that by simple mechanical modification this area of optional control on the part of the operator may be minimized, as by the use of a dashpot connected to control lever 118 and operative during movements of valve 88 between sections 90 and 94. However, this would not be particularly desirable inasmuch as a simple dashpot or analogous control on the actuation of valve 118 would minimize the flexibility of that control in respect of operation at various engine speeds. The additional cost to limit automatically the operation of control 118 as a function of engine speed would not appear to be justified. Operator skill in controlling the system will be rapidly attained in practice.

When operating the vehicle in reverse the operator need merely shift his foot to the left side of pedal control 26 which, upon depression, actuates cable 18 in an opposite direction to that in forward drive and reverses the angle of the swash plate of pump 14 effecting a reversal of flow throughout the traction drive portion of the system, thereby converting flow division at units 48 and 52 to flow combining. In reverse drive depending upon the selected position of control 118, all or a part of the pump discharge flows into the front wheel traction loop via conduits 62, 60 and 58, in the latter of which the flow divides and drives motors 42 and 44, being recombined at unit 52 and returning to the pump via conduits 50 and 46, and divider-combiner unit 48 when valve 88 is operating on either of valve sections 86 or 90. When valve section 94 is operative a part of the total system driving fluid then flowing returns to pump via conduits 50, 96 and 84, and section 49 of unit 48 which then functions to recombine all fluid flow thereto to pump inlet conduit 46. The flow in the traction circuit of motors 76 and 78 also flows in a reverse direction when in four-wheel drive as illustrated, and is recombined with flow from conduit 50 by combiner section 49. Both divider-combiner units function to control the volume of traction fluid flowing to each of the four drive motors in reverse as in forward drive; i.e., one-half of the total fluid volume flows in conduit 50 through section 47 and one-half in conduit 66 through section 49. The portion flowing in conduit 50 is made up of portions flowing through motors 42 and 44 which are recombined at unit 52. Manipulating wheels 12 to various steering angles in reverse drive effects portions of flow combined at unit 52 in sections 51 and 53 which are the reverse of the portions divided at said sections in forward drive at the same steer angles.

Both the charging and pump control circuits associated with pump 150, and the fluid cooling circuit associated with valves 98 and 102 function the same as previously, as does valve 64. The pump maximum and minimum pressure controls previously described function the same in both forward and reverse drive with the control thereof operating through the upper or lower side of shuttle valve 80, as described previously, depending upon pump operation in forward or reverse.

It will now be appreciated that full braking capability is inherent in our transmission system, rendering service brakes unnecessary. Normal deceleration of the vehicle is effected merely by releasing the accelerator pedal 30 in the usual manner; an increased rate of deceleration may be obtained by releasing both pedals 30 and 26 while underway in either two or four-wheel drive. Positive braking of the vehicle may be effected by reversing pump 14 while maintaining engine speed, and under emergency conditions a "panic" stop is accomplished by reversing the pump and increasing the engine speed. Furthermore, if the vehicle is operating in two-wheel drive additional braking force is available by quick shifting of valve 88 from section 94 to either of valve sections 90 or 86. A quick shift of control valve 88 is always available to the operator from any one condition of operation to any other and may be accomplished without damage to the system, the effect being merely to avoid the normally smooth operation available in transition by timing the movement of valve 88 as a function of engine speed. On wet or icy surfaces it may be particularly desirable to shift from two to four-wheel drive during emergency stops in order to achieve the additional benefits of four-wheel traction.

Figure 6:
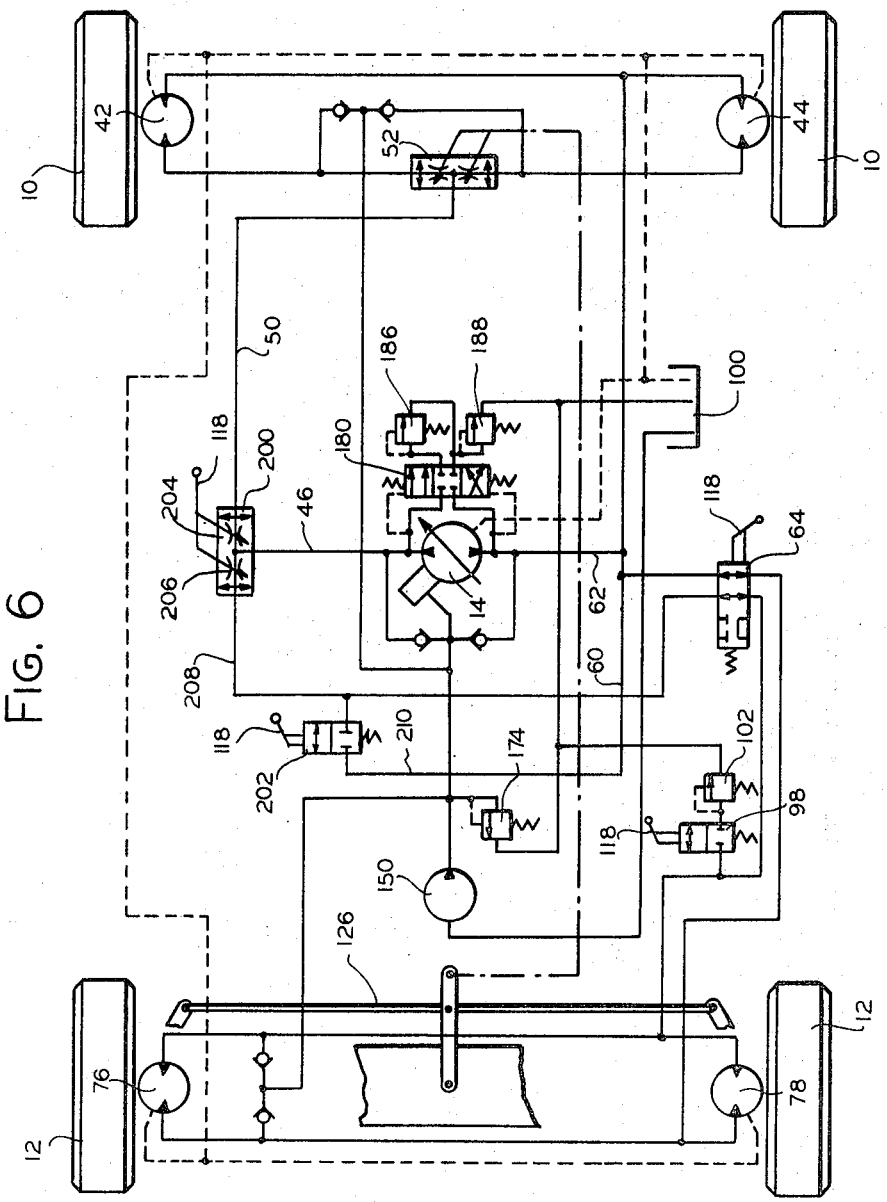
FIG. 6 is a modification of the invention as shown in FIG. 1.

Referring now to FIG. 6, the modified embodiment of our invention there illustrated is the same in most respects as the embodiment of FIG. 1, and similar parts have been similarly numbered. The differences between the circuits of FIGS. 1 and 6 is in the substitution for valve 88 and the non-adjustable flow divider-combiner 48 of FIG. 1 of an adjustable flow divider-combiner 200 and of a valve 202 in FIG. 6, and consequent changes in the conduit connections. The adjustable flow divider-combiner 200 is connected in the circuit between conduits 50 and 46 the same as is divider-combiner unit 48 in FIG. 1. Valve 202 is adapted to bypass valve 64, being connected by conduits 208 and 210 to pump inlet via conduits 60 and 62. Divider-combiner unit 200 has a capability similar to that of adjustable divider-combiner unit 52 of FIG. 1, except that unit 200 is capable of controlling fluid flow between sections 204 and 206 thereof from 0 to 100 per cent of flow, i.e., the unit is capable of shifting the flow entering the unit such that substantially the total volume of fluid flows through section 204 and substantially none of the fluid flows through section 206. An adjustable unit of this type is manufactured by Fluid Controls, Inc., supra, and is identified as Model 2VCXP1950. Unit 52 of FIG. 1 need be only capable of adjusting the flows through motors 42 and 44 as required by the steering angles available at wheels 12.

In effect, unit 200 performs the function of valve 88 of FIG. 1, but more smoothly. It will be appreciated that when valve 202 is positioned as shown the vehicle is in four-wheel drive; adjustable unit 204 is set such that one-half of the total volume of circuit fluid flows through each of its sections 204 and 206. This condition is analogous to the condition existent when valve 88 is located as illustrated in FIG. 1. Then shifting valve 202 to an open position, which is controlled by manual control 118 in coordination with control of valves 64 and 98, and of unit 200, effects a condition of two-wheel drive at front wheel motors 42 and 44 at one-half speed with one-half of the total volume of circuit fluid returning to the pump by way of conduits 208, 210, 60 and 62, valves 64 and 98 having been coordinately closed and opened, respectively, by control 118. This phase of the operation is similar to that of FIG. 1 when section 90 of valve 88 is operative. Now in order to increase vehicle speed in two-wheel drive from one-half to full speed the operator manipulates the hand control 118 which adjusts the flow through the respective sections 204 and 206 of unit 200 at a rate of change selected by the operator until all of the flow through valve 202 has been interrupted, at which time the total circuit flow is through section 204 for further division at divider-combiner unit 52, and is analogous to the operation of FIG. 1 when unit 88 is operating on section 94 thereof.

Although we have described and illustrated only two embodiments of our invention, it will be understood by persons skilled in the art that modifications may be made in the structure, form and relative arrangements of parts without necessarily departing from the spirit and scope of the invention. Accordingly, it should be understood that we intend to cover by the appended claims all such modifications which fall within the scope of our invention.

We claim:

1. A hydrostatic power transmission system for a vehicle having first and second pairs of selectively driveable wheels comprising hydraulic fluid drive means, first and second pairs of selectively driveable hydraulic motor means for driving respective pairs of said wheels and adapted to be driven by said fluid drive means, said fluid drive means also being adapted to distribute the hydraulic fluid to drive said first and second pairs of motor means when all said motor means are driving said wheels, and control means operatively connected to said fluid drive means for interrupting the flow of fluid to one pair of said motor means and redirecting it to the other pair of said motor means to effect a shift from four to two-wheel drive without interrupting the flow of traction fluid to said other pair of motor means, said control means including transition control means operative to redirect to the low pressure side of the system the fluid flow to said one pair of motor means to facilitate smooth vehicle operation during the transition from four to two-wheel drive.

2. A power transmission system as claimed in claim 1 wherein said fluid drive means includes variable displacement pump means, said pump means and motor means being reversible for driving the vehicle either in forward or reverse and for rapidly braking the vehicle, and operator control means for controlling the speed, displacement and direction of said pump means at all times during vehicle operation whereby rapid vehicle braking may be effected by a reversal of torque at the motor means.

3. A power transmission system as claimed in claim 1 wherein said control means includes means operative to direct one portion of distributed fluid selectively to said one pair of motor means or to said low pressure side of the system or to said other pair of motor means.

4. A power transmission system as claimed in claim 3 wherein said latter operative means is adjustable valve means to modulate at a selected rate the redirection of fluid flow from said low pressure side to said other pair of motor means.

5. A power transmission system as claimed in claim 1 wherein said fluid drive means includes variable displacement pump means and fluid flow divider means, and said control means includes selector valve means operative to direct the fluid flow from one side of said flow divider means either to said one pair of motor means, or to the inlet of the pump means, or to said other pair of motor means.

6. A power transmission system as claimed in claim 5 wherein a fluid cooling circuit is adapted to circulate a portion of the fluid in the circuit of said one pair of motor means to a reservoir means when said selector valve means directs the fluid flow either to the inlet of said pump means or to said other pair of motor means.

7. A transmission system as claimed in claim 6 wherein charge pump means is connected to the reservoir and to the circuit of said one pair of motor means for maintaining said latter circuit fully fluid charged when said fluid cooling circuit circulates a portion of said fluid.

8. A power transmission system as claimed in claim 5 wherein said flow divider means is adjustable to control the flow to said one pair of motor means between approximately no flow and an intermediate flow, and to control the flow to said other pair of motor means between said intermediate flow and full flow.

9. A power transmission system as claimed in claim 1 wherein at least one pair of said driveable wheels are also steer wheels, and a flow divider means in circuit with said fluid drive means with a pair of said motor means and responsive to steering of said steer wheels for proportioning between the latter pair of motor means as a function of steering angle a predetermined portion of said hydraulic fluid.

10. A power transmission system as claimed in claim 9 wherein said one pair of motor means are in a parallel hydraulic circuit for driving the steer wheels, steer linkage means connecting said steer wheels, and said other pair of motor means are in a parallel hydraulic circuit for driving the other pair of wheels, said flow divider means being operatively in circuit with said other pair of motor means and operatively connected to the steer linkage of said pair of steer wheels.

11. A transmission system as claimed in claim 1 wherein said fluid drive means includes variable displacement pump means and fluid-divider means, said fluid-divider means distributing the output of said pump means to said pairs of motor means when all said motor means are driving said wheels such that each wheel travels substantially the same circumferential distance in the same period of time as each other wheel of said pairs of wheels irrespective of variations in surface traction as between any one wheel and any other wheel.

12. A transmission system as claimed in claim 11 wherein one pair of said wheels are also dirigible wheels, and second fluid-divider means is in circuit with the first-mentioned fluid-divider means and with a pair of said motor means, said second fluid-divider means being responsive to steering angles of said dirigible wheels for dividing between the latter pair of motor means as a function of steering angle that portion of hydraulic fluid directed to said second fluid-divider means by said first fluid-divider means.

13. A transmission system as claimed in claim 1 wherein said fluid drive means includes variable displacement pump means and fluid-divider means, said fluid-divider means distributing the output of said pump means when all said motor means are driving said wheels substantially one-half pump output to the first pair of said motor means and substantially one-half pump output to the second pair of said motor means.

14. A transmission system as claimed in claim 1 wherein said fluid drive means includes a variable displacement pump means, an engine driving said pump means, said control means including first manually manipulatable operator means for controlling the displacement of said pump means, second manually manipulatable operator means controlling engine speed, said first and second operator means being adapted to directly control in combination the engine and pump for optimum operation under varying conditions of vehicle operation, and third manually manipulatable operator means for controlling the said redirection of the interrupted fluid portion.

15. A transmission system as claimed in claim 14 wherein said third manually manipulatable operator means includes adjustable valve means to modulate at a selected rate the redirection of fluid flow from said low pressure side to said other pair of motor means.

16. A hydrostatic power transmission system for a vehicle having first and second pairs of selectively driveable wheels, one pair of which are also steer wheels, comprising hydraulic fluid drive means, first and second pairs of selectively driveable reversible hydraulic motors for driving respective pairs of said wheels and adapted to be driven by said fluid drive means, said fluid drive means including distributor means in circuit with said pairs of motors adapted to distribute the hydraulic fluid to said first and second pairs of motors when all said motors are driving said wheels in one direction and irrespective of the torque required at any wheel, and for combining the return fluid from said first and second pairs of motors when all said motors are driving said wheels in an opposite direction and irrespective of the torque required at any wheel, a fluid divider-combiner means in circuit with said distributor means and with a pair of said motors and responsive to steering of said steer wheels for proportioning between the latter pair of motors as a function of steering angle in both forward and reverse drive a portion of said hydraulic fluid, first control means for controlling the displacement and direction of said fluid drive means, and second control means operatively connected to said distributor means for interrupting the flow of fluid to one pair of said motors and for redirecting it to the other pair of motors to effect two-wheel drive without interrupting the flow of traction fluid to said other pair of motors, said second control means including transition control means operative to redirect to the low pressure side of the system the fluid flow to said one pair of motors to facilitate smooth vehicle operation during the transition from four to two-wheel drive.

17. A power transmission system as claimed in claim 16 wherein a fluid cooling circuit is adapted to circulate a portion of the fluid in the circuit of said one pair of motors to a reservoir means when said second control means directs the fluid flow either to said low pressure side or to said other pair of motors, and charge pump means connected to the reservoir and to the circuit of said one pair of motors for maintaining said latter circuit fully fluid charged when said fluid cooling circuit circulates a portion of said fluid.

18. A hydrostatic power transmission system for a vehicle having an engine and first and second pairs of selectively driveable wheels comprising a reversible variable displacement engine driven hydraulic pump means, first and second pairs of selectively driveable reversible hydraulic motors for driving respective pairs of said wheels and adapted to be driven by said pump means, a fluid divider means in circuit with said pairs of motors for dividing in a predetermined manner the pumped fluid to said first and second pairs of motors when all said motors are driving said wheels, first operator control means for controlling the speed of the engine, second operator control means for controlling the displacement and direction of said pump means, and third operator control means operatively connected to said fluid divider means for interrupting the flow of fluid to one pair of said motors and for redirecting it to the other pair of motors to effect a shift from four to two-wheel drive, and for reconnecting said latter fluid flow to said one pair of motors to effect a shift from two to four-wheel drive, said system being adapted to accommodate such shifting during traction driving of the vehicle and without interrupting the fluid flow to said other pair of motors said first and second operator control means being operable singly or together in either two or four-wheel drive to brake the veicle by reversing the direct of operation of the pump means either with or without an increase in engine speed, and said third operator control means including transition control means operative to redirect to the inlet of the pump means the fluid flow to said one pair of motors to facilitate a smooth transition from four to two-wheel drive, said first and second operator control means being manipulatable to brake the vehicle also during said operative condition of said transition control means.

19. A hydrostatic power transmission system for a vehicle having a first pair of transversely spaced rotatable means and second rotatable means spaced longitudinally from the pair of rotatable means comprising fluid drive means, hydraulic motor means for driving respective ones of said first and second rotatable means adapted to be driven by said fluid drive means, said fluid drive means being adapted also to distribute the hydraulic fluid to drive said hydraulic motor means when all said motor means are driving said first and second rotatable means, and control means operatively connected to said fluid drive means for interrupting the flow of fluid to the hydraulic motor means which drives one of said first or second rotatable means and redirecting it to the motor means driving the other rotatable means to effect a shift from driving said first and second rotatable means to driving said latter other rotatable means without interrupting the flow of traction fluid to said hydraulic motor means which drives said other rotatable means, said control means including transition control means operative to redirect to the low pressure side of the hydraulic system the fluid flow to said one of said first or second rotatable means to facilitate smooth vehicle operation during transition from driving said first and second rotatable means to driving said other rotatable means.

20. A transmission system as claimed in claim 19 wherein when said fluid drive means is driving said first and second rotatable means in non-dirigible movement the distribution of hydraulic fluid to the motor means is such that the first and second rotatable means traverse substantially the same circumferential distance in the same period of time irrespective of variations in surface or road traction as between surface or road engaging elements of any of said rotatable means.

21. A transmission system as claimed in claim 20 wherein said first and second rotatable means are wheel means, at least one of which wheel means is dirigible, and fluid-divider means in circuit with said fluid drive means and with certain of said hydraulic motor means and responsive to steering of the dirigible wheel means so that a predetermined portion of the said hydraulic fluid is proportioned between the wheels of said first pair of wheel means as a function of steering angle.

22. A transmission system as claimed in claim 20 wherein said fluid drive means comprises variable displacement pump means and fluid-divider means, said fluid-divider means distributing the hydraulic fluid to said motor means to effect said traverse of such circumferential distance.

23. A transmission system as claimed in claim 19 wherein said second rotatable means comprises a second pair of transversely spaced rotatable means, said fluid drive means including variable displacement pump means, and said control means including operator control of the displacement of said pump means.

24. A transmission system as claimed in claim 19 wherein said fluid drive means includes a variable displacement pump means, an engine driving said pump means, said control means including manually manipulatable operator means for controlling the displacement of said pump means, and other manually manipulatable operator means controlling engine speed, said operator means and other operator means being adapted to directly control in combination the engine and pump means for optimum operation under varying conditions of vehicle operation.

25. A hydrostatic power transmission system for a vehicle having a first pair of transversely spaced rotatable means and second rotatable means spaced longitudinally from the pair of rotatable means comprising fluid drive means, hydraulic motor means for driving respective ones of said first and second rotatable means adapted to be driven by said fluid drive means, said fluid drive means being adapted also to distribute the hydraulic fluid to drive said hydraulic motor means when all said motor means are driving said first and second rotatable means, and control means operatively connected to said fluid drive means for interrupting the flow of fluid to the hydraulic motor means which drives one of said first or second rotatable means and redirecting it to the motor means driving the other rotatable means to effect a shift from driving said first and second rotatable means to driving said latter other rotatable means without interrupting the flow of traction fluid to said hydraulic motor means which drives said other rotatable means, said control means which interrupts the flow of fluid being operative to redirect the interrupted fluid portion selectively from said one of said first or second rotatable means to the low pressure side of the hydraulic system and then to said other rotatable means, and in that order of succession, in order to facilitate smooth vehicle operation during transition from driving said first and second wheel-like means to driving said other rotatable means.

26. A transmission system as claimed in claim 25 wherein said control means which interrupts the flow of fluid includes adjustable valve means operable to modulate at a selected rate the redirection of fluid flow from said low pressure side of the hydraulic system to said other rotatable means.

27. A transmission system as claimed in claim 25 wherein said first and second rotatable means comprise wheel means at least one of which wheel means is dirigible, and fluid-divider means in circuit with said fluid drive means and with certain of said hydraulic motor means and responsive to steering of the dirigible wheel means so that a predetermined portion of the said hydraulic fluid is proportioned between the wheels of said first pair of wheel means as a function of the steering angle.

28. A transmission system as claimed in claim 27 wherein said fluid drive means when driving said first and second wheel means in non-dirigible movement effects a distribution of hydraulic fluid to the respective motor means such that all of the wheels traverse substantially the same circumferential distance in the same period of time irrespective of variations in surface or road traction as between any of said wheels.

29. A transmission system as claimed in claim 28 wherein said latter control means is operator controlled and said operative means comprises adjustable valve means to modulate at a selected rate the redirection of fluid flow from said low pressure side to said other pair of motor means.

30. A transmission system as claimed in claim 25 wherein said fluid drive means includes a variable displacement pump means and an engine driving said pump means, said control means including first manually manipulatable operator means for controlling the displacement of said pump means, second manually manipulatable operator means controlling engine speed, said first and second operator means being adapted to directly control in combination the engine and pump for optimum operation under varying conditions of vehicle operation, and third manually mainpulatuble operator means for controlling the said redirection of the interrupted fluid portion.

31. A transmission system as claimed in claim 30 wherein said first and second rotatable means comprise wheel means, at least one of which wheel means is dirigible and fluid-divider means in circuit with said fluid drive means and with certain of said hydraulic motor means and responsive to steering of the dirigible wheel means so that a predetermined portion of the said hydraulic fluid is proportioned between the wheels of said first pair of wheel means as a function of steering angle.

* * * * *